(12) United States Patent
Hintz et al.

(10) Patent No.: US 9,321,057 B2
(45) Date of Patent: Apr. 26, 2016

(54) SEPARATION APPARATUS AND PROCESSES

(75) Inventors: Christopher Hintz, Savannah, GA (US); Amber Wilkinson, Savannah, GA (US)

(73) Assignee: Savannah State University, Savannah, GA (US)

( * ) Notice: Subject to any disclaimer, the term of this patent is extended or adjusted under 35 U.S.C. 154(b) by 1067 days.

(21) Appl. No.: 13/300,883

(22) Filed: Nov. 21, 2011

(65) Prior Publication Data

US 2012/0125836 A1    May 24, 2012

Related U.S. Application Data (60) Provisional application No. 61/415,418, filed on Nov. 19, 2010.

(51) Int. Cl.
| | |
|---|---|
| *B03D 1/26* | (2006.01) |
| *B01D 21/24* | (2006.01) |
| *C02F 1/24* | (2006.01) |
| *G21F 9/02* | (2006.01) |
| *B03D 1/24* | (2006.01) |
| *G21F 9/06* | (2006.01) |
| *B01D 21/00* | (2006.01) |

(52) U.S. Cl.
CPC *B03D 1/245* (2013.01); *B03D 1/26* (2013.01); *G21F 9/02* (2013.01); *G21F 9/06* (2013.01); *B01D 21/0084* (2013.01); *B01D 21/24* (2013.01); *B01D 21/245* (2013.01); *B03D 2203/003* (2013.01); *C02F 1/24* (2013.01)

(58) Field of Classification Search
CPC .. B03D 1/1468; B03D 1/1412; B03D 1/1493; B03D 1/242; B03D 1/245; B01D 21/0084; B01D 21/24; B01D 21/245; C02F 1/24

USPC .................. 210/221.2, 221.1, 511
See application file for complete search history.

(56) References Cited

U.S. PATENT DOCUMENTS

| | | | |
|---|---|---|---|
| 1,420,138 A * | 6/1922 | Peck | B03D 1/06 |
| | | | 209/165 |
| 1,505,323 A * | 8/1924 | Eberenz | B03D 1/001 |
| | | | 209/166 |
| 3,371,779 A * | 3/1968 | Hollingsworth | B01F 5/0212 |
| | | | 209/166 |
| 4,431,531 A * | 2/1984 | Hollingsworth | 209/170 |
| 5,467,876 A * | 11/1995 | Hicks et al. | 209/170 |
| 5,551,574 A | 9/1996 | Hicks et al. | |
| 5,665,227 A | 9/1997 | Watt | |
| 5,667,671 A | 9/1997 | Munsch et al. | |
| 5,776,335 A * | 7/1998 | Overath | B01D 24/12 |
| | | | 210/108 |
| 6,156,209 A | 12/2000 | Kim | |

(Continued)

*Primary Examiner* — Katherine Zalasky
(74) *Attorney, Agent, or Firm* — Jordan IP Law, LLC; Edgar G. Rodriguez (57) ABSTRACT

An apparatus may include a separator and/or a discharger. A separator may include a separator channel, an influent portion configured to allow the passage of a first fluid into a separator channel, an effluent portion disposed above an influent portion and/or a fluid-lift portion between an influent portion and an effluent portion. A discharger may be disposed below a fluid-lift portion and/or may include a portion external to a separator channel, which may include a downward angle relative to an effluent portion and/or may be configured to minimize the passage of a second fluid into a discharger as the second fluid buoyantly travels in a separator channel from an influent portion to an effluent portion. A second fluid may have a density that is less than the density of a first and/or may be configured to lift a first fluid to a fluid-lift portion.

20 Claims, 9 Drawing Sheets

(56) References Cited

U.S. PATENT DOCUMENTS

| | | |
|---|---|---|
| 6,436,295 B2 | 8/2002 | Kim |
| 6,808,625 B1 | 10/2004 | Wu |
| 7,025,883 B1 | 4/2006 | Olivier |
| 7,094,335 B2 | 8/2006 | Patron |
| 7,264,714 B2 | 9/2007 | Joneid |
| 7,306,733 B2 | 12/2007 | Olivier |
| 7,442,306 B2 | 10/2008 | Olivier |
| 7,624,969 B2 | 12/2009 | Schletz et al. |
| 2001/0000601 A1 | 5/2001 | Kim |
| 2003/0201232 A1 | 10/2003 | Cheyne |
| 2005/0109695 A1 | 5/2005 | Oliver |
| 2005/0183998 A1* | 8/2005 | Joneid .......................... 210/169 |
| 2006/0144784 A1 | 7/2006 | Oliver |
| 2006/0273037 A1 | 12/2006 | Venezia |
| 2007/0069403 A1 | 3/2007 | Schletz et al. |
| 2007/0193955 A1 | 8/2007 | Nelson |
| 2007/0193956 A1 | 8/2007 | Nelson |

\* cited by examiner

SEPARATION APPARATUS AND PROCESSES

CROSS-REFERENCES TO RELATED APPLICATIONS

This application claims the benefit of U.S. Provisional Application No. 61/415,418, filed Nov. 19, 2010, which is hereby incorporated by reference in its entirety.

STATEMENT REGARDING FEDERALLY SPONSORED RESEARCH OR DEVELOPMENT

This invention was made with government support under grant number NNA06CB14H, funded by the United States National Aeronautics and Space Administration. The government has certain rights in the invention.

BACKGROUND

Separation, filtration, accumulation and/or collection of target material from one or more fluids may be important in a variety of environments. For example, hydrophobic material, such as hydrocarbon-based material, may need to be separated from water. In another example, gas such as NOx and/or Radon may need to be separated from air. Related apparatus and/or processes may require a relatively large amount of energy to cause a separation, filtration, accumulation and/or collection of target material. Furthermore, related apparatus and/or processes may require a relatively large amount of energy to retrieve one or more fluids following a separation, filtration, accumulation and/or collection of target material. Moreover, related apparatus and/or processes may damage target material as a result of a separation, filtration, accumulation and/or collection of target material.

SUMMARY

Embodiments may relate to an apparatus configured, and/or a process operable, to separate, filter, concentrate, accumulate, direct and/or collect target material and/or one or more fluids. In one aspect of embodiments, a relatively small amount of energy may be employed, for example to separate, filter, concentrate, accumulate, direct and/or collect target material and/or one or more fluids. In another aspect of embodiments, a relatively small amount of energy may be employed to retrieve and/or recover target material, and/or one or more fluids involved in a separation, filtration, concentration, accumulation, direction and/or collection. In further aspects of embodiments, damage to target material and/or one or more fluids as a result of a separation, filtration, concentration, accumulation, direction and/or collection may be minimized.

Embodiments may relate to an apparatus. According to some aspects of embodiments, an apparatus may include a separator. In some aspects of embodiments, a separator may include a separator channel. In one aspect of embodiments, a separator may include an influent portion, which may be configured to allow the passage of a first fluid into a separator channel. In another aspect of embodiments, a separator may include an effluent portion, which may be configured to accumulate target material and/or allow the passage of target material, for example out of a separator channel. In further aspects of embodiments, an effluent portion may be disposed over, opposite and/or above an influent portion.

According to some aspects of embodiments, a separator may include a fluid-lift portion. In some aspects of embodiments, a fluid-lift portion may be disposed and/or formed between an influent portion and an effluent portion. In another aspect of embodiments, a separator may be configured to accommodate a reaction and/or separation. In further aspects of embodiments, a reaction and/or separation may include a chemical, radioactive, and/or physical reaction and/or separation.

According to some aspects of embodiments, an apparatus may include a discharger. In one aspect of embodiments, a discharger may be disposed under, opposite and/or below a fluid-lift portion. In one aspect of embodiments, a discharger may include a portion external to a separator channel. In another aspect of embodiments, a discharger may include a portion having an angle relative to an effluent portion, for example a downward angle relative to an effluent portion. In further aspects of embodiments, a portion of a discharger including an angle, for example a downward angle, relative to an effluent portion may be configured to minimize the passage of a second fluid into the discharger, for example as a second fluid travels in a separator channel between an influent portion and an effluent portion (e.g., from an influent portion to an effluent portion). In embodiments, a second fluid may buoyantly travel in a separator channel between an influent portion and an effluent portion.

According to some aspects of embodiments, a discharger may include a discharge channel. In some aspects of embodiments, a discharge channel may include a discharge outlet disposed under, opposite and/or below a fluid-lift portion. In one aspect of embodiments, a separator channel and/or a discharge channel may be any shape, for example the approximate shape of a column, a box, a rectangle, a cone, an amorphous shape, and/or the like. In another aspect of embodiments, a discharge channel and/or a separator channel may be arranged in any suitable configuration relative to each other, for example substantially concentric to each other, substantially parallel to each other, substantially un-parallel to each other, and/or the like. In further aspects of embodiments, a separator may be connected, for example fluidly connected, to another separator, plurality of separators and/or a plurality of dischargers. In other aspects of embodiments, a discharger may be connected, for example fluidly connected, to another discharger, plurality of discharges and/or a plurality of separators. In embodiments, a membrane, for example a perforated membrane, may be disposed between a separator and a discharger, for example between a separator channel and a discharger.

According to some aspects of embodiments, a first fluid and a second fluid may include different densities. In some aspects of embodiments, a first fluid and/or a second fluid may include a liquid and/or a gas. In one aspect of embodiments, a second fluid may include a density that is less than the density of a first fluid. In another aspect of embodiments, a second fluid may be configured to move a first fluid. In further aspects of embodiments, a second fluid may be configured to lift a first fluid to a fluid-lift portion. For example, in some embodiments, the second fluid may be configured as a plurality of hubbies.

According to some aspects of embodiments, an apparatus may include an injector. In one aspect of embodiments, an injector may be disposed under, opposite and/or below a discharger. In another aspect of embodiments, an injector may be configured to introduce a second fluid, for example into a first fluid and/or an influent portion. In further aspects of embodiments, an injector may be configured to introduce a second fluid as a plurality of bubbles.

According to some aspects of embodiments, an apparatus may be configured to be disposed across a fluid-fluid surface. In one aspect of embodiments, a fluid-fluid surface may include a liquid-liquid, a gas-gas, and/or a liquid-gas surface. In another aspect of embodiments, a fluid-lift portion of an apparatus may be disposed between a fluid-fluid surface and a portion of the apparatus, for example an effluent portion of the apparatus.

According to some aspects of embodiments, an apparatus may include a catchment receptacle. In one aspect of embodiments, a catchment receptacle may be configured to connect to an effluent portion of a separator. In another aspect of embodiments, a catchment receptacle may include an effluent outlet. In further aspects of embodiments, a catchment receptacle may be configured to collect and/or filter target material, and/or to direct the passage of target.

According to some aspects of embodiments, an apparatus may be configured to generate and/or maintain a concentration gradient for a target material, for example between an influent portion and the effluent portion. In one aspect of embodiments, a concentration gradient may include a larger concentration at an effluent portion than at an influent portion.

According to some aspects of embodiments, an apparatus may be configured to separate, collect, filter, concentrate and/or preserve target material. In some aspects of embodiments, target material may include dissolved and/or undissolved constituents. In one aspect of embodiments, dissolved constituents may include a hydrophobic compound, an organic compound and/or a biologically-created compound. In another aspect of embodiments, undissolved constituents may include a single-cellular organism, a multicellular organism, phytoplankton, algae, grass, free floating plant matter, zooplankton, bacteria, yeast, virus, fungus, detritus, suspended sediment and/or waste. In further aspects of embodiments, target material may include dissolved and/or undissolved gas, liquid and/or solid material.

Embodiments may relate to a process. According to some aspects of embodiments, a process may include passing a first fluid into an influent portion of a separator channel. In one aspect of embodiments, a first fluid may include a target material. In another aspect of embodiments, a process may include introducing a second fluid into the influent portion, for example to contact a first fluid. In further aspects of embodiments, a second fluid may be configured to move a first fluid, for example configured to lift a first fluid through a separator channel to a fluid-lift portion of the separator channel. In embodiments, a first fluid may have a different density that a second fluid, for example a second fluid may have a density that is less than the density of the first fluid.

According to some aspects of embodiments, a process may include accepting target material in an effluent portion of a separator channel. In one aspect of embodiments, accepting target material may include employing the passage of a second fluid traveling in a separator channel, for example between an influent portion and an effluent portion (e.g., from an influent portion to an effluent portion). In another aspect of embodiments, a second fluid may buoyantly travel in a separator channel between an influent portion and an effluent portion.

According to some aspects of embodiments, a process may include employing a discharger to accept filtered first fluid. In some aspects of embodiments, filtered first fluid may include first fluid having less target material relative to ambient first fluid. In one aspect of embodiments, a discharger may be disposed under, opposite and/or below a fluid-lift portion. In another aspect of embodiments, a discharger may include a portion external to a separator channel. In further aspects of embodiments, a discharger may include a portion having an angle relative to an effluent portion, for example a downward angle relative to an effluent portion, which may be configured to minimize the passage of a second fluid into the discharger.

According to some aspects of embodiments, a process may include introducing a second fluid at a rate configured to minimize damage to the target material. In some aspects of embodiments, a process may include introducing a second fluid configured to minimize damage to the target material. In other aspects of embodiments, a process may include allowing a second fluid to travel between an influent portion and an effluent portion substantially unobstructed to minimize damage to the target material. In further aspects of embodiments, a process may include allowing a target material to accumulate in, and/or pass through, an effluent portion to minimize damage to the target material.

According to some aspects of embodiments, a process may include creating a back-lift pressure sufficient to approximately maximize a discharge rate of a first fluid discharged through a discharger. In some aspects of embodiments, a first fluid discharged though a discharger may include filtered first fluid. In other aspects of embodiments, a process may include discharging a first fluid through a discharger may include employing back-lift pressure created in a separator.

DRAWINGS

Example

Example

Example

Example

Example

Example

Examples

Example

Example

DESCRIPTION

Embodiments may relate to an apparatus. According to some aspects of embodiments, an apparatus may be configured to separate, collect, filter, concentrate, accumulate, direct and/or preserve a first fluid, second fluid and/or target material. In one aspect of embodiments, an apparatus may be formed of any desired material, for example a metal (e.g., base metal, ferrous metal, noble metal, precious metal and/or the like), polymer (e.g., thermoplastic, thermoset and/or the like, and/or having any desired monomer arrangement such as alternating, periodic, statistical, block, graft and/or the like), ceramic (e.g., crystalline, noncrystalline and/or the like), and/or composite material (e.g., cement, fiberglass reinforced plastic, wood, and/or the like). In another aspect of embodiments, a material employed to fabricate an apparatus may be determined and/or selected based on any factor, for example a fluid employed, a target material desired, and/or a process such as a separation, collection, filtering, concentration, accumulation, direction and/or preserving.

According to some aspects of embodiments, an apparatus may be formed by any desired process, for example by a molding and/or modular process. In one aspect of embodiments, the constituents of an apparatus may be molded as a single component. In another aspect of embodiments, the constituents of an apparatus may be molded and/or otherwise fabricated as a plurality of components, which may be connected as desired. In further aspects of embodiments, components may be mechanically releasably connected, for example employing a threaded connection, snap connection, lock-and-key connection, rail connection, magnetic connection and/or the like. In other aspects of embodiments, components may be fixedly connected, for example employing a weld connection, adhesive connection and/or the like. In embodiments, components may be connected in moveable arrangements, for example free to rotate and/or slide past each other manually, automatically and/or the like.

According to some aspects of embodiments, an apparatus may be configured to allow a first fluid and/or a second fluid to interact. In some aspects of embodiments, a first fluid and/or a second fluid may include a liquid. In one aspect of embodiments, a liquid may include any compound having a liquid phase, for example a solution (e.g., homogenous mixture solvent (e.g., non-polar, polar aprotic, polar protic), oil, emulsion, suspension heterogeneous mixture), surfactant, and/or the like. In another aspect of embodiments, a first fluid and/or a second fluid may include a gas. In further aspects of embodiments, a gas may include any compound having a gas phase, for example a halogen-based gas (e.g., $Cl_2$), carbon-based gas (e.g., $CO_2$, alkanes), nitrogen-based gas (e.g. $N_2$, NOx), oxygen, ozone, acid (e.g., HF, HCl, HBr) and/or the like.

According to some aspects of embodiments, a first fluid and a second fluid may include different densities. In one aspect of embodiments, a second fluid may include a density that is less than the density of a first fluid. In one aspect of embodiments, a second fluid may include a density that is greater than the density of a first fluid. In another aspect of embodiments, a second fluid may be configured to move a first fluid, for example configured to lift a first fluid. As illustrated in some aspects of embodiments in example FIG. 1, second fluid 142 may include a greater density than first fluid 183 and/or may be configured to lift first fluid 183.

According to some aspects of embodiments, a fluid may include target material. In one aspect of embodiments, a target material may include dissolved and/or undissolved constituents. In embodiments, dissolved constituents may include a hydrophobic compound, an organic compound and/or a biologically-created compound, for example Polycyclic Aromatic Hydrocarbons (PAHs), Chloro-fluorocarbons (CFCs), lubrication oils, petroleum products, petroleum distillates, liposomes, vessicles, carbon nanotubes, nanowires, quantum dots, beads, organometallics, amino acids, nucleic acids, drug molecules, and/or the like. In embodiments, undissolved constituents may include a single-cellular organism, a multicellular organism, phytoplankton, algae, grass, free floating plant matter, zooplankton, bacteria, yeast, virus, fungus, detritus, suspended sediment, waste, wastewater solids, fecal matter, clays, silts and/or the like. In another aspect of embodiments, target material may include dissolved and/or undissolved gas, liquid and/or solid constituents. As illustrated in some aspects of embodiments in FIG. 1, first fluid 183 may include target material 152.

According to some aspects of embodiments, an apparatus may be configured to be disposed across a fluid-fluid surface. In one aspect of embodiments, a fluid-fluid surface may include a liquid-liquid, ages-gas, and/or a liquid-gas surface.

Figure 1:
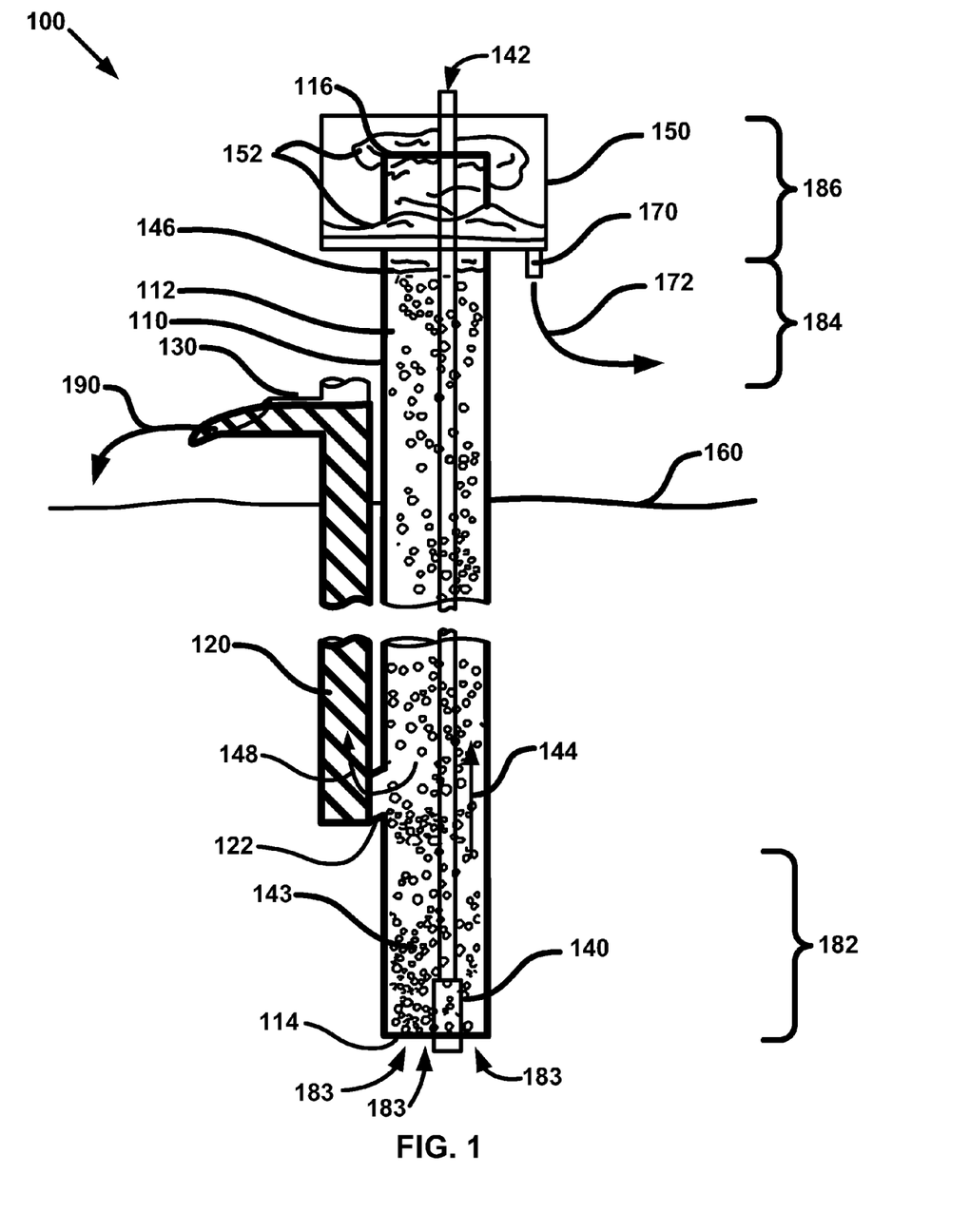
FIG. 1 illustrates a cross-sectional view of a separation apparatus in accordance with some aspects of embodiments.
Figure 2:
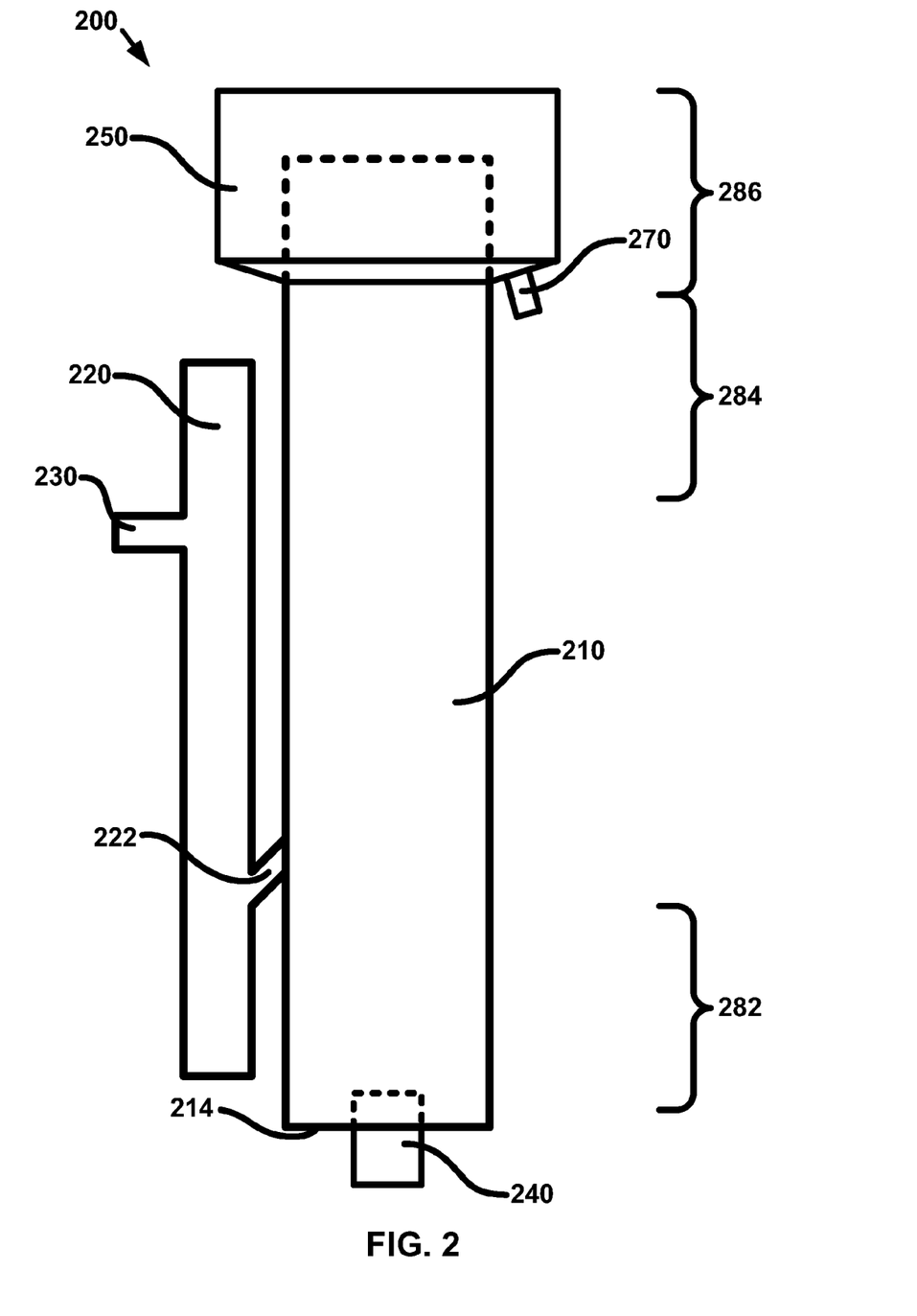
FIG. 2 illustrates a front view of a separation apparatus in accordance with some aspects of embodiments.

As illustrated in some aspects of embodiments in FIG. 1, apparatus 100 may be configured to be disposed across fluid-fluid surface 160, for example across an air-water surface. In another aspect of embodiments, an apparatus may be configured to be disposed in an environment irrespective of a fluid-fluid surface. As illustrated in some aspects of embodiments in example FIG. 2, apparatus 200 may be configured to be disposed in an environment irrespective of a fluid-fluid surface.

According to some aspects of embodiments, an apparatus may include a separator. In one aspect of embodiments, a separator may include a separator channel. In another aspect of embodiments, a separator may include an influent portion and/or an effluent portion. As illustrated in some aspects of embodiments in FIG. 1, apparatus 100 may include separator 110, influent portion 182 and/or effluent portion 186.

According to some aspects of embodiments, an influent portion may be configured to allow the passage of a first fluid into a separator channel. In some aspects of embodiments, an influent portion may include an influent opening, which may be fluidly connected with first fluid. In embodiments, an influent opening may be configured to allow a first fluid to pass into a separator channel. In one aspect of embodiments, a first fluid may be pumped into a separator channel. In another aspect of embodiments, a first fluid may be drawn into a separator channel. In further aspects of embodiments, an influent opening may be disposed at any desired position relative to an apparatus, for example on a sidewall of a separator, at an end of a separator and/or the like. As illustrated in some aspects of embodiments in FIG. 1, influent opening 114 may be fluidly connected with first fluid 183 and/or may be configured to allow first fluid 183 to pass into separator channel 112.

According to some aspects of embodiments, an effluent portion may be disposed over, opposite and/or above an influent portion. In some aspects of embodiments, an effluent portion may be configured to allow the passage of target material out of a separator channel. In one aspect of embodiments, a target material may be pumped out of a separator channel. In another aspect of embodiments, a target material may be drawn out of a separator channel. In further aspects of embodiments, an effluent portion may be configured to concentrate, preserve, collect and/or direct target material out of a separator channel. In other aspects of embodiments, an effluent portion may include an effluent opening, which may be disposed at any desired position relative to an apparatus, for example on a sidewall of a separator, at an end of a separator and/or the like. As illustrated in one aspect of embodiments in FIG. 1, effluent opening 116 may be configured to allow target material 152 to pass out of separator channel 112.

According to some aspects of embodiments, an apparatus may include a catchment receptacle. In one aspect of embodiments, a catchment receptacle may be configured to connect to an effluent portion of an apparatus. In another aspect of embodiments, a catchment receptacle may include an effluent outlet. In further aspects of embodiments, a catchment receptacle may be configured to collect, filter, direct, accumulate and/or concentrate a target material. As illustrated in some aspects of embodiments in FIG. 1, catchment receptacle 150 may be configured to connect to effluent portion 186, collect target material 152 from separator channel 112, and/or direct the passage of target material 152 along path 172 employing effluent outlet 170.

According to some aspects of embodiments, a second fluid may be pumped into a separator channel. In embodiments, a second fluid may be drawn into a separator channel. In some aspects of embodiments, an apparatus may include an injector. In one aspect of embodiments, an injector may be disposed under, opposite and/or below a discharger. In another aspect of embodiments, an injector may be configured to introduce a second fluid into a first fluid and/or an influent portion. In further aspects of embodiments, an injector may be configured to introduce a second fluid as a plurality of bubbles. In other aspects of embodiments, a second fluid may travel in a separator channel between an influent portion and an effluent portion. As illustrated in some aspect of embodiments of FIG. 1, second fluid 142 introduced as a plurality of bubbles 143 into first fluid 183 by injector 140 and/or may buoyantly travel along path 144 in separator channel 112 between influent portion 182 and an effluent portion 186.

Figure 3:
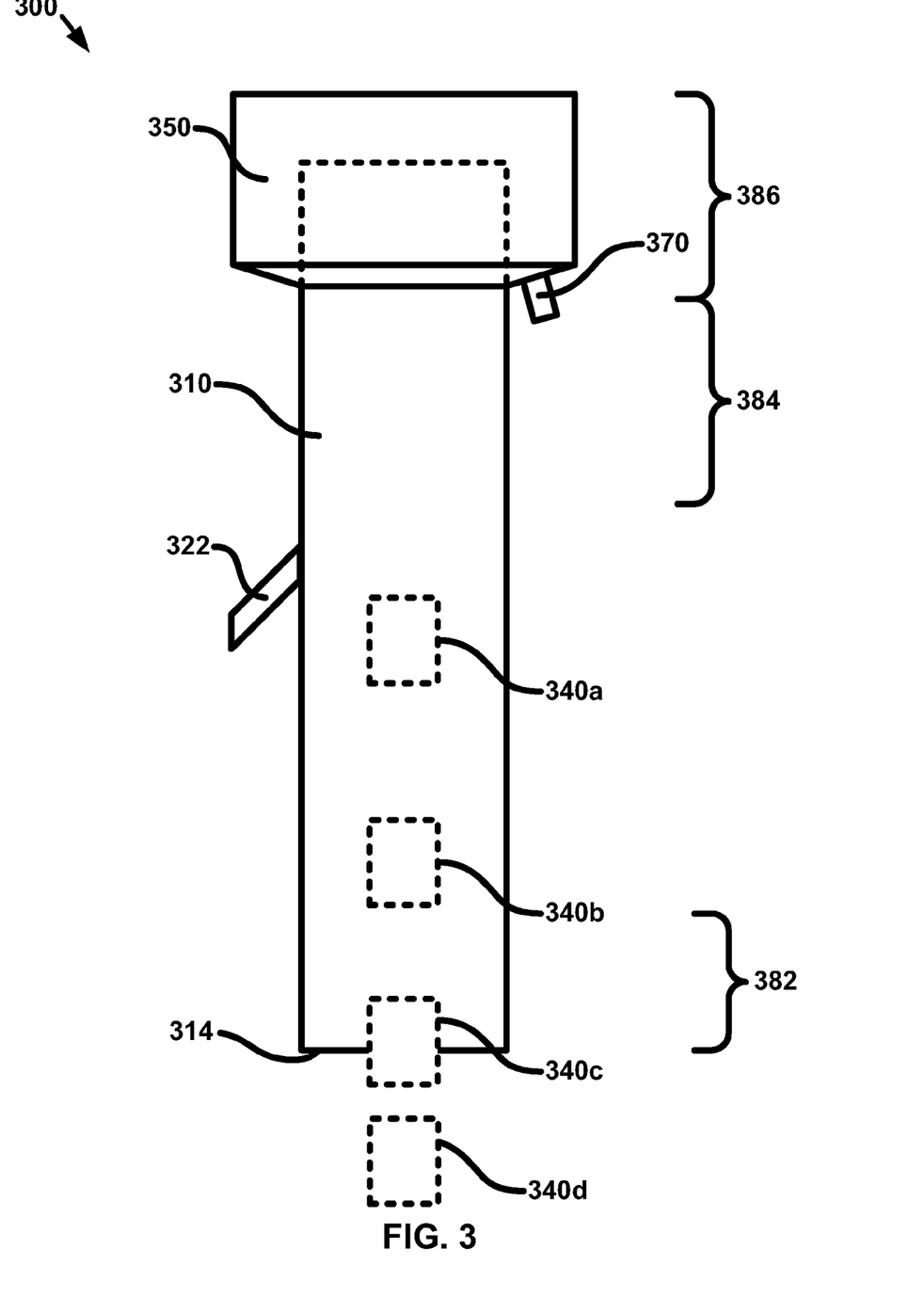
FIG. 3 illustrates a front view of a separation apparatus in accordance with some aspects of embodiments.

According to some aspects of embodiments, an injector may be disposed at any desired location relative to an apparatus. In one aspect of embodiments, an injector may be disposed in a separator, for example completely or partially disposed in a separator. In another aspect of embodiments, an injector may be in fluid connection with a separator. As illustrated in some aspects of embodiments in example FIG. 3, one or more injectors 340a, 340b, 340c and/or 340d may be disposed under, opposite and/or below discharger 322. In some aspects of embodiments, injector 340a and/or 340b may be completely disposed in separator 310, injector 340c may be partially disposed in separator 310 and/or injectors 340a, 340b, 340c, and/or 340c may be in fluid connection with separator 310.

According to some aspects of embodiments, a separator may include a fluid-lift portion. In some aspects of embodiments, a fluid-lift portion may be disposed between an influent portion and an effluent portion. In one aspect of embodiments, a fluid-lift portion may include a fluid-lift. In another aspect of embodiments, a fluid-lift may be formed between an influent portion and an effluent portion. As illustrated in some aspects of embodiments in FIG. 1, separator 110 may include fluid-lift portion 184 disposed between influent portion 182 and effluent portion 186, and/or may include fluid-lift 146.

According to some aspects of embodiments, a fluid-lift may be formed by employing a second fluid (e.g., $N_2$) having a density that is different than the density of a first fluid (e.g., water). In some aspects of embodiments, a first fluid may be moved (e.g., lifted) to a fluid-lift portion. In another aspect of embodiments, a fluid-lift portion and/or fluid-lift may be disposed between a fluid-fluid surface and a portion of an apparatus, for example an effluent portion of an apparatus. In further aspects of embodiments, a fluid-lift may be adjacent froth, which may include concentrated target material. As illustrated in some aspects of embodiments in FIG. 1, fluid-lift 146 may be formed by employing second fluid 142, such that first fluid 183 may be moved (e.g., lifted) to fluid-lift portion 184 and/or such that fluid-lift 146 may be disposed between fluid-fluid surface 160 and effluent portion 186.

According to some aspects of embodiments, an apparatus may include a discharger. In some aspects of embodiments, a discharger may be disposed under, opposite and/or below a fluid-lift portion and/or a fluid-lift. In one aspect of embodiments, a discharger may include a portion external to separator channel. In another aspect of embodiments, a discharger may include a portion internal to a separator channel, for example a baffle. As illustrated in some aspects of embodiments in FIG. 1, discharger 122 may be disposed under, opposite and/or below fluid-lift portion 184 and/or fluid-lift 146, and/or may include a portion external to separator channel 112.

According to some aspects of embodiments, a discharger may include a portion having an angle relative to a portion of an apparatus. In some aspects of embodiments, an angle may include a downward angle, for example relative to an effluent portion. In some aspects of embodiments, an angle may include an upward angle, for example relative to an effluent portion. In one aspect of embodiments, a portion of a discharger including an angle relative to a portion of an apparatus may be configured to minimize the passage of a second fluid and/or target material into a discharger, for example as a second fluid travels through a separator channel between portions of an apparatus (e.g., from an influent portion to an effluent portion). In another aspect of embodiments, a portion of a discharger having an angle relative to a portion of an apparatus may include a portion adjacent a separator and/or a separator channel. As illustrated in some aspects of embodiments in FIG. 1, discharger 122 may include a portion having a downward angle relative to effluent portion 186, which may be configured to minimize the passage of second fluid 142 (e.g., configured as plurality of bubbles 143) as it travels along path 144 in separator channel 112 from influent portion 182 to effluent portion 186.

According to some aspects of embodiments, a discharger may include a discharge channel. In some aspects of embodiments, a discharge channel may include a discharge outlet. In one aspect of embodiments, a discharge channel and/or a discharge outlet may be disposed under, opposite and/or below a fluid-lift portion and/or a fluid-lift. In another aspect of embodiments, a discharge channel and/or a discharge outlet may be disposed between a fluid-lift portion and/or a fluid lift and a fluid-fluid surface. In further aspects of embodiments, a discharge channel and/or a discharge outlet may be disposed in first fluid and/or a second fluid. As illustrated in some aspects of embodiments in FIG. 1, discharge channel 120 may be partially disposed in first fluid 183 and second fluid 142, discharge outlet 130 may be disposed in second fluid 142, and/or discharge channel 120 and discharge outlet 130 may be disposed between fluid lift portion 184 and fluid-fluid surface 160.

According to some aspects of embodiments, an apparatus may be configured to accommodate an interaction between a first fluid and a second fluid. In some aspects of embodiments, an interaction may include a chemical, radioactive and/or physical reaction, and/or separation. In one aspect of embodiments, an interaction between a first fluid and a second fluid may cause a target material to be separated from a first fluid. In another aspect of embodiments, an interaction between a first fluid and a second fluid may form substantially filtered first fluid. In further aspects of embodiments, filtered first fluid may include a minimized concentration of target material and/or second fluid (e.g., plurality of bubbles). In embodiments, for example, an interaction may include sterilization of cells during separation, for example by a gas including $Cl_2$, $O_3$ and/or the like. In embodiments, radioactive daughter products may be physically and/or chemically separated, for example when parents are not substantially removed. In embodiments, for example, radioactive material may be quantitatively removed, for example as a function of concentration of parent radioactivity.

As illustrated in some aspects of embodiments in FIG. 1, an interaction between first fluid 183 and second fluid 142 (e.g., plurality of bubbles 143) may form filtered first fluid 190, which may include a minimized concentration of target material 152 and/or second fluid 183 (e.g., plurality of bubbles 143). In further aspects of embodiments, filtered first fluid 190 may be formed when target material 152 is attracted to, and/or captured by, second fluid 142 (e.g., plurality of bubbles 143) traveling in first fluid 183. In other aspects of embodiments, a hydrophobic material may be amendable to flotation by attachment to a second fluid. As illustrated in some aspects of embodiments in FIG. 1, a target material including hydrophobic components may be amendable to flotation by attachment to rising plurality of bubbles 143, such that the target material may be entrained in rising plurality of bubbles 143.

According to some aspects of embodiments, an apparatus may be configured to generate and/or maintain a concentration gradient for a target material, for example between an influent portion and the effluent portion. In one aspect of embodiments, a concentration gradient may include a larger concentration at an effluent portion than at an influent portion. In another aspect of embodiments, a concentration gradient may include a smaller concentration at an effluent portion than at an influent portion. As illustrated in one aspect of embodiments in FIG. 1, apparatus 100 may be configured to generate and/or maintain a concentration gradient for target material 152 between influent portion 182 and effluent portion 186, for example a greater concentration of target material 152 at effluent portion 186 relative to influent portion 182.

According to some aspects of embodiments, a back-lift pressure may be generated and/or provided, for example by moving a first fluid employing a second fluid. In some aspects of embodiments, a back-lift pressure may be formed by a pressure head. In one aspect of embodiments, a pressure head may be formed when second fluid 142 (e.g., plurality of bubbles 143) moves first fluid 183. In another aspect of embodiments, a back-lift pressure may be formed by a differential pressure. In embodiments, a differential pressure may be formed by lifting first fluid 183 in separator 110 to a threshold position, for example to fluid-lift 146. In other aspects of embodiments, a back-lift pressure may be formed by a differential elevation. In embodiments, a differential elevation include the height of fluid 183 between fluid-lift 146 and fluid-fluid surface 160, and/or the height of fluid 183 relative to the height of filtered first fluid 190.

According to some aspects of embodiments, pressure and/or pressure head of a fluid may be calculated and/or determined employing any suitable relation. In some aspects of embodiments, the flow rate of a first fluid through a separator and/or the flow rate of filtered first fluid through a discharger may be calculated and/or determined employing any suitable relation. Without being bound to any particular relation and/or theory, pressure (e.g., static pressure) of an incompressible fluid may be determined employing example equation (1), where p2=pressure at level 2, p1=pressure at level 1, z2=level 2, z1=level 1, and γ is the specific weight of the fluid, and/or pressure head of an incompressible fluid may be determined employing equation (2), where h=pressure head, $h=(p2-p1)/\gamma$. As another non-limiting example, the flow rate of a compressible and/or incompressible fluid may be calculated and/or determined employing a form of Bernoulli's equation, for example for incompressible fluids in equation (3), where v=fluid flow, g is acceleration due to gravity, z is elevation, p is the pressure and r is the density. In embodiments, the constant Bernoulli's equation may be normalized to calculate and/or determine total head.

$$p2-p1=-\gamma(z2-z1) \quad (1)$$

$$h=(p2-p1)/\gamma \quad (2)$$

$$v2/2+gz+p/r=\text{constant} \quad (3)$$

According to some aspects of embodiments, a back-lift pressure may be sufficient to drive a flow of a fluid. In one aspect of embodiments, a back-lift pressure may be sufficient to drive a flow of substantially filtered first fluid 190 through discharger 122, for example along path 148. In another aspect of embodiments, a back-lift pressure may be sufficient to approximately maximize a discharge rate of filtered first fluid 190 discharged through discharger 122, for example along path 148. In embodiments, the energy employed to drive a fluid flow and/or collect target material and/or one or more fluids may be relatively low, for example having a substantial contribution from introducing second fluid 142 (e.g., 143) to first fluid 183.

Figure 4:
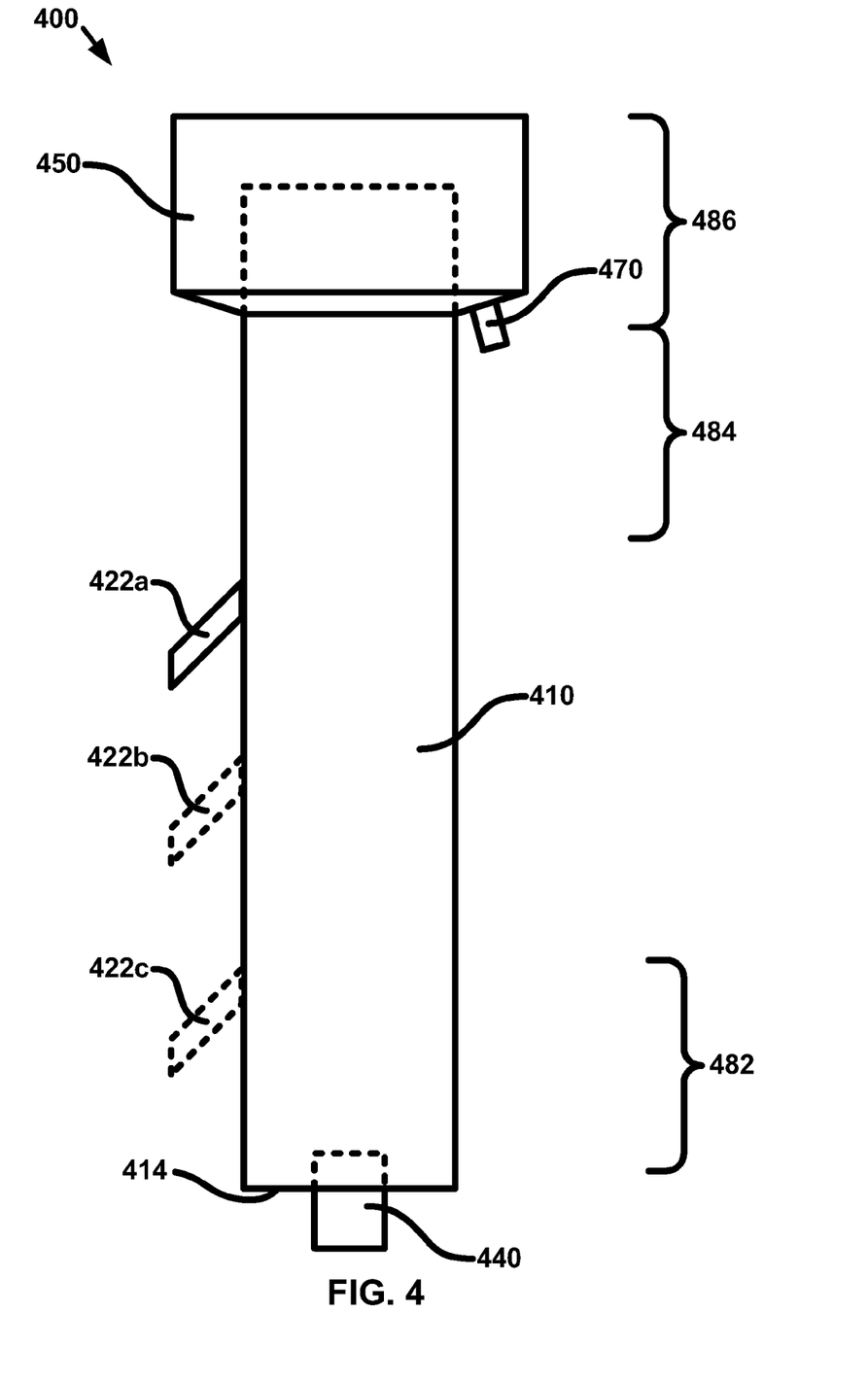
FIG. 4 illustrates a front view of a separation apparatus in accordance with some aspects of embodiments.
Figure 5:
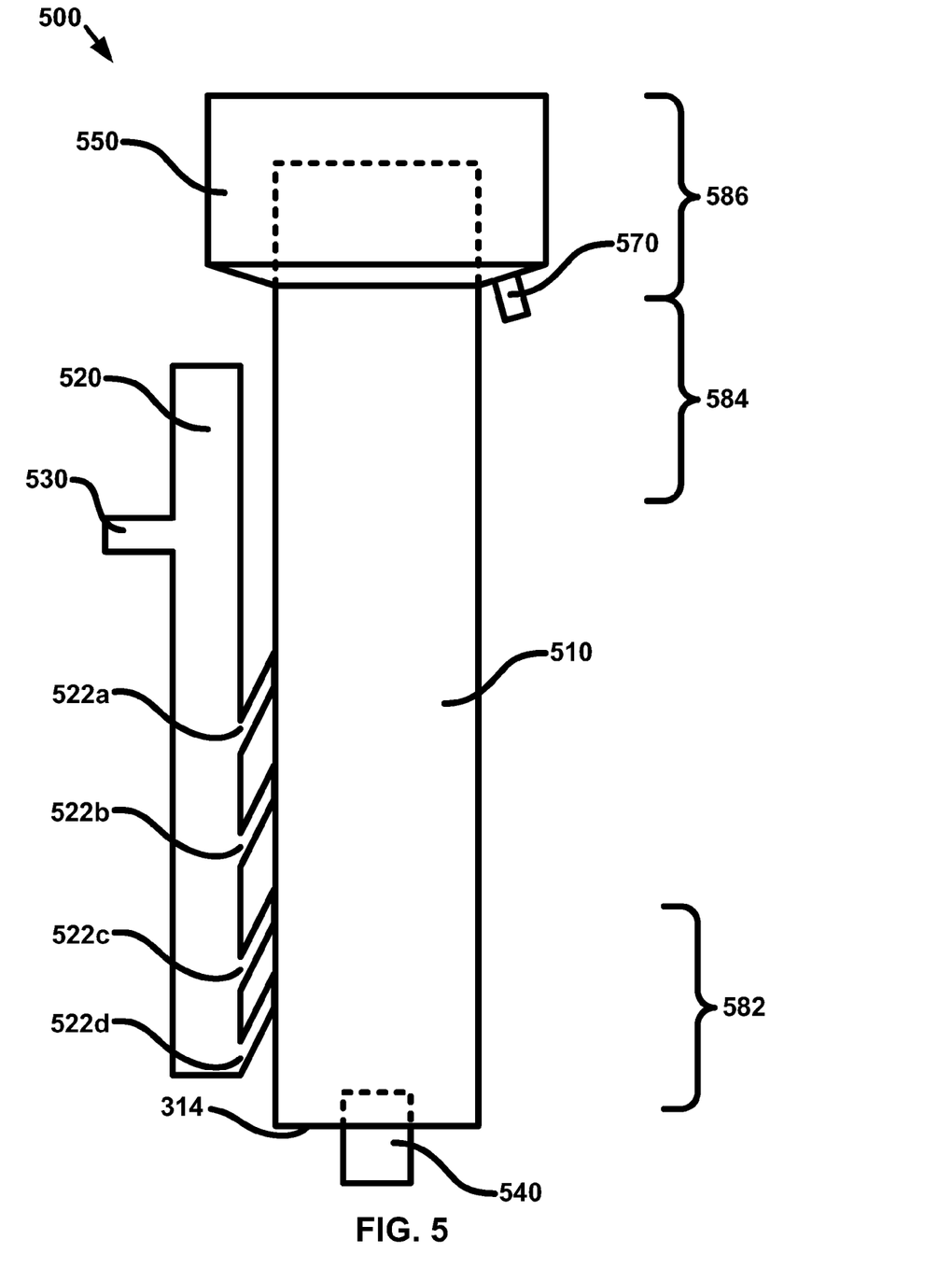
FIG. 5 illustrates a front view of a separation apparatus in accordance with some aspects of embodiments.
Figure 6:
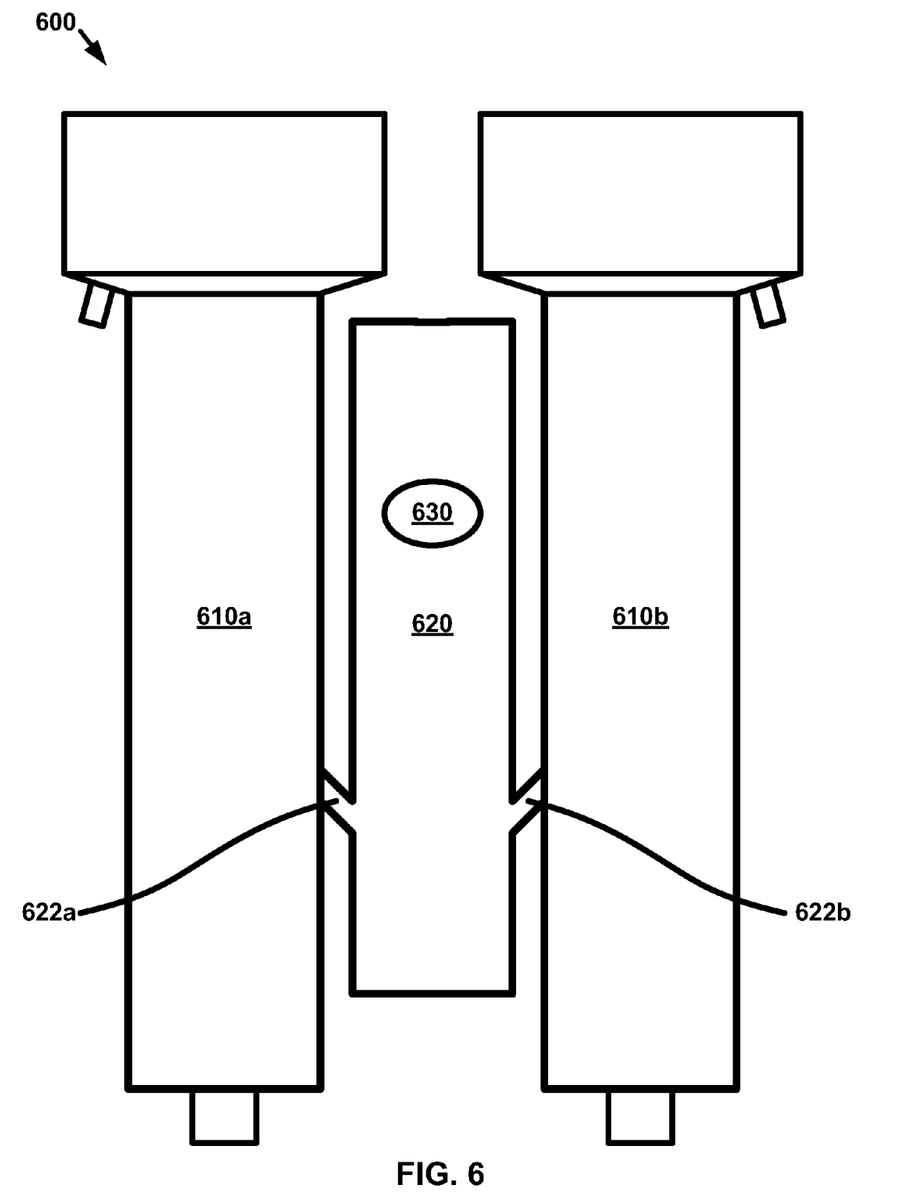
FIG. 6 illustrates a front view of a separation apparatus in accordance with some aspects of embodiments.

According to some aspects of embodiments, a separator and/or a discharger may be connected in any desired configuration. In one aspect of embodiments, a single separator may be connected to a single discharger. As illustrated in some aspects of embodiments in example FIG. 1 to FIG. 3, separators 110, 210 and 310 may be connected to dischargers 122, 772 and 322, respectively. In another aspect of embodiments, a single separator may be connected to a one or more dischargers. As illustrated in further aspects of embodiments in examples FIG. 4 to FIG. 5, separator 410 may be connected to dischargers 422a, 422b and/or 422c, and/or separator 510 may be connected to dischargers 522a, 522b, 522c and/or 572d. In further aspects of embodiments, a separator may be connected to another separator, directly and/or indirectly. As illustrated in other aspects of embodiments in example FIG. 6, separator 610a may be indirectly connected with separator 610b through discharger 622a, 622b and/or discharge column 620.

According to some aspects of embodiments, a discharger may be connected to one or more discharge channels and/or discharge outlets. As illustrated in some aspects of embodiments in FIG. 1, FIG. 2 and FIG. 6, discharges 122, 222, 622a and 622b may be connected to a single discharge channel 120, 220 and 620, and/or to a single discharge outlet 130, 230, and 630, respectively. As illustrated in other aspects of embodiments in FIG. 5, discharges 522a, 522b, 522c and/or 522d may be connected to a single discharge channel 520 and/or a single discharge outlet 530.

Figures 7A, 7B:
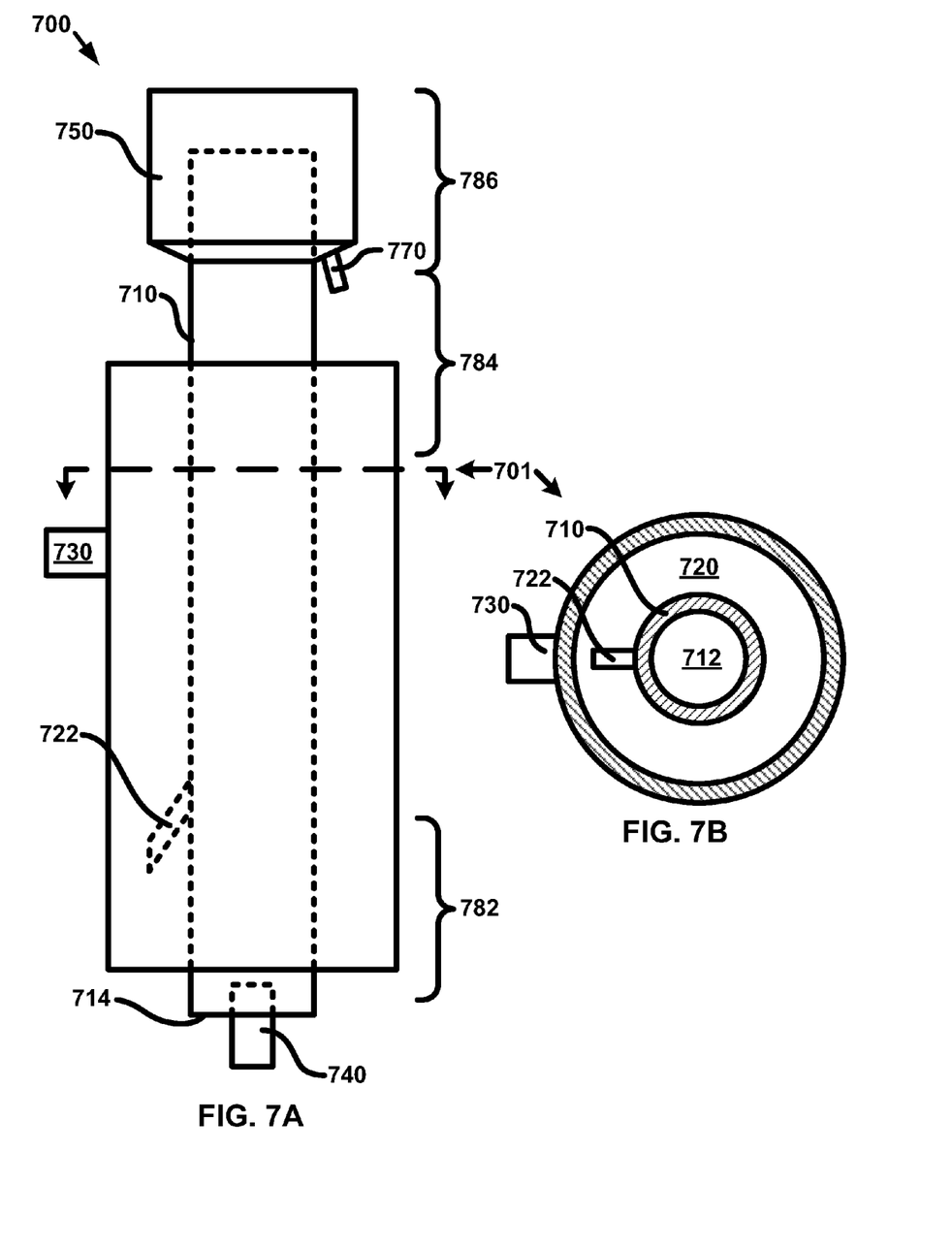
FIG. 7A and FIG. 7B illustrate a front view and a cross-sectional view, respectively, of a separation apparatus in accordance with some aspects of embodiments.

According to some aspects of embodiments, a separator and/or discharger may be arranged in any suitable configuration relative to each other, for example substantially parallel to each other, substantially unparallel to each, substantially concentric to each other and/or the like. As illustrated in some aspects of embodiments in FIG. 1 to FIG. 2 and FIG. 5 to FIG. 6, discharge channels 120, 220, 320 and 620 may be substantially parallel to separator channels of separators 110, 210, 310, 610 a and/or 610 b, respectively. In another aspect of embodiments, a separator channel and/or a discharger channel may be unparallel relative to each other, for example having a downward and/or upward angle relative to each other. As illustrated in further aspects of embodiments in FIG. 7A showing an apparatus 700 and 7B showing a cross-sectional view of the apparatus 700 along line 701, separator channel 712 and discharge channel 720 may be arranged substantially concentric to each other.

According to some aspects of embodiments, a separator and/or discharger may be any desired geometry, for example the approximate shape of a column, a square, a rectangle, a cone, an amorphous shape and/or the like. In some aspects of embodiments, a separator and/or discharger may include any desired dimension, for example length, diameter and/or the like. In embodiments, for example, a separator may be between approximately 1.5 and 2.0 cm. In other aspects of embodiments, separator 110 may include any desired diameter, for example a diameter between approximately 10 and 15 cm, and/or discharge channel 120 may include a diameter of approximately 5 cm. As illustrated in some aspects of embodiments in FIG. 1, separator channel 112 and/or a discharge channel 120 may be in the approximate shape of a column, and/or may include any desired dimension.

According to some aspects of embodiments, an apparatus may be configured to be employed in any desired orientation. As illustrated in some aspects of embodiments in example FIG. 8, influent opening 814 may be fluidly connected with a first fluid and/or may be configured to allow a first fluid to pass into separator 810. In some aspects of embodiments, effluent opening 816 may be configured to allow a target material to pass out of separator 810. In one aspect of embodiments, catchment receptacle 850 may be configured to connect to effluent portion 886, collect a target material disposed in first fluid from separator 810, and/or direct the passage of a target material employing effluent outlet 870.

Figure 8:
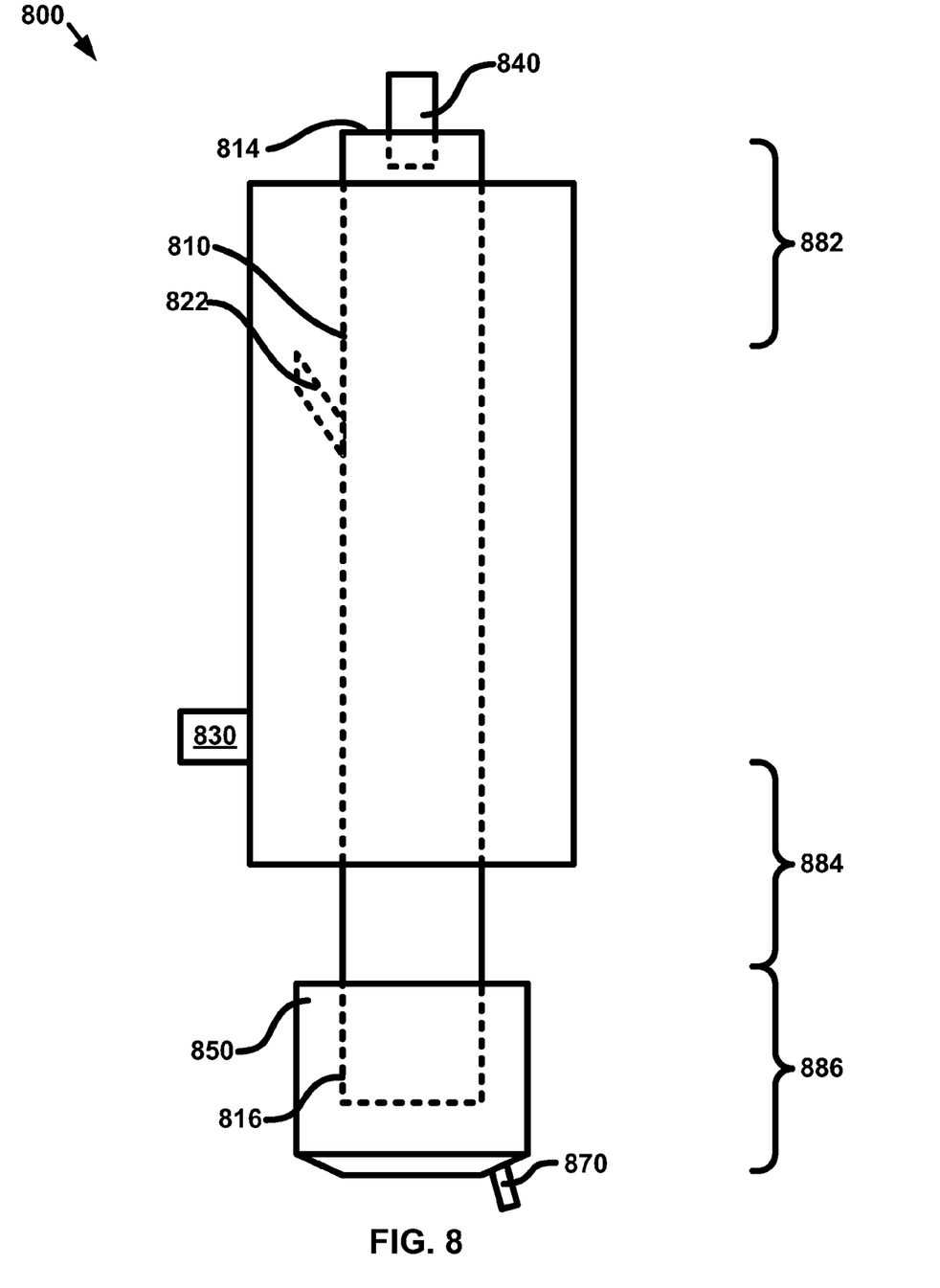
FIG. 8 illustrates a front view of a separation apparatus in accordance with some aspects of embodiments.

According to some aspects of embodiments, fluid-lift portion 884 may be disposed between influent portion 882 and effluent portion 886, which may include a fluid-lift. In one aspect of embodiments, a fluid-lift may be formed by employing a second fluid, such that a first fluid may be moved (e.g., lifted) to the fluid-lift portion. In another aspect of embodiments, a second fluid may be introduced into a first fluid by injector 840. In further aspects of embodiments, discharger 822 may be disposed over, opposite and/or above fluid-lift portion 884, may include a portion external to separator 110, and/or may include a portion having an upward angle relative to effluent portion 886. In embodiments, a portion of discharger 822 including an upward angle relative to effluent portion 886 may be configured to minimize the passage of a second fluid and/or target material into discharger 822.

According to some aspects of embodiments, a back-lift pressure may be generated and/or provided, for example by moving a first fluid from influent portion 882 to effluent portion 886. In one aspect of embodiments, a back-lift pressure may be sufficient to drive a flow of a fluid. In another aspect of embodiments, a back-lift pressure may be sufficient to drive a flow of substantially filtered first fluid through discharger 822. In more aspects of embodiments, a back-lift pressure may be sufficient to approximately maximize a discharge rate of a filtered first fluid discharged through discharger 822. According to some aspects of embodiments, an apparatus may be may be employed in a low gravity environment, such as in space and/or the like.

According to some aspects of embodiments, the orientations, connections, configurations, components, geometries, fluid properties, fluid interactions and/or dimensions are factors which may be employed to select and/or tailor apparatus properties, for example flow rate, pressure, concentration gradient, accumulation and/or the like. In one aspect of embodiments, a flow rate may include any desired rate, for example a flow rate of a first fluid processed per minute, the flow rate of filtered first fluid, the flow rate to accepted target material (e.g., collection rate, accumulation rate, concentration rate, etc.) and/or the like. In another aspect of embodiments, any factor may be considered and/or adjusted. In embodiments, for example, a back-lift pressure, rate that a second fluid is introduced, type of fluid employed, orientation and/or the like may be considered and/or adjusted as desired.

According to some aspects of embodiments, factors may be adjusted at any time, for example at fabrication, deployment and/or the like. In further aspects of embodiments, the rate that a second fluid is introduced may be adjusted automatically by a controller as desired. In embodiments, for example, adjustments may be based on occurrence of an event, such as rate of output of target material. In embodiments, for example, the dimensions of an apparatus may be adjusted, for example as by introducing a tapered segment in a modular separator configuration, dynamically modifying one or more paths (e.g, flow paths).

According to some aspects of embodiments, an apparatus may include any desired material, for example employed and/or selected to accommodate a desired process. In some aspects of embodiments, a membrane may be employed between a separator and a discharger, for example to minimize the passage of target material and/or second fluid in a discharger. In one aspect of embodiments, a membrane may be disposed between a separator channel and a discharger. In another aspects of embodiments, a membrane may be disposed on a sidewall of a separator channel, for example at an interface between a separator channel and a discharger. In further aspects of embodiments, a membrane may include a perforated membrane. In more aspects of embodiments, a membrane may include any material, for example regenerated cellulose, polyethersulfone, polyvinylchloride, polytetrafluoroethane polypropylene, and/or the like. In embodiments, a membrane may include any desired attributes, for example a pore size between approximately 0.22 µm and 5 mm, ASTM-selected mesh sizes, for example related to plastic and/or metal mesh and/or screens cloth, fabric and/or glass fiber. In embodiments, other attributes may include dimensions, geometry, orientation, diffusivity, permeability and/or the like.

Embodiments may relate to a process. According to some aspects of embodiments, a process may include accepting target material and/or one or more fluids, for example to separate, filter, concentrate, accumulate, direct and/or collect target material and/or one or more fluids. As illustrated in some aspects of embodiments in example FIG. 9, a process may include passing a first fluid into an influent portion of a separator channel (910). In some aspects of embodiments, a first fluid may include a target material. In other aspects of embodiments, a process may include introducing a second fluid into an influent portion to allow an interaction between a first fluid and a second fluid. As illustrated in some aspects of embodiments in FIG. 9, a process may include introducing a second fluid into an influent portion to allow a first fluid to contact a second fluid (920).

Figure 9:
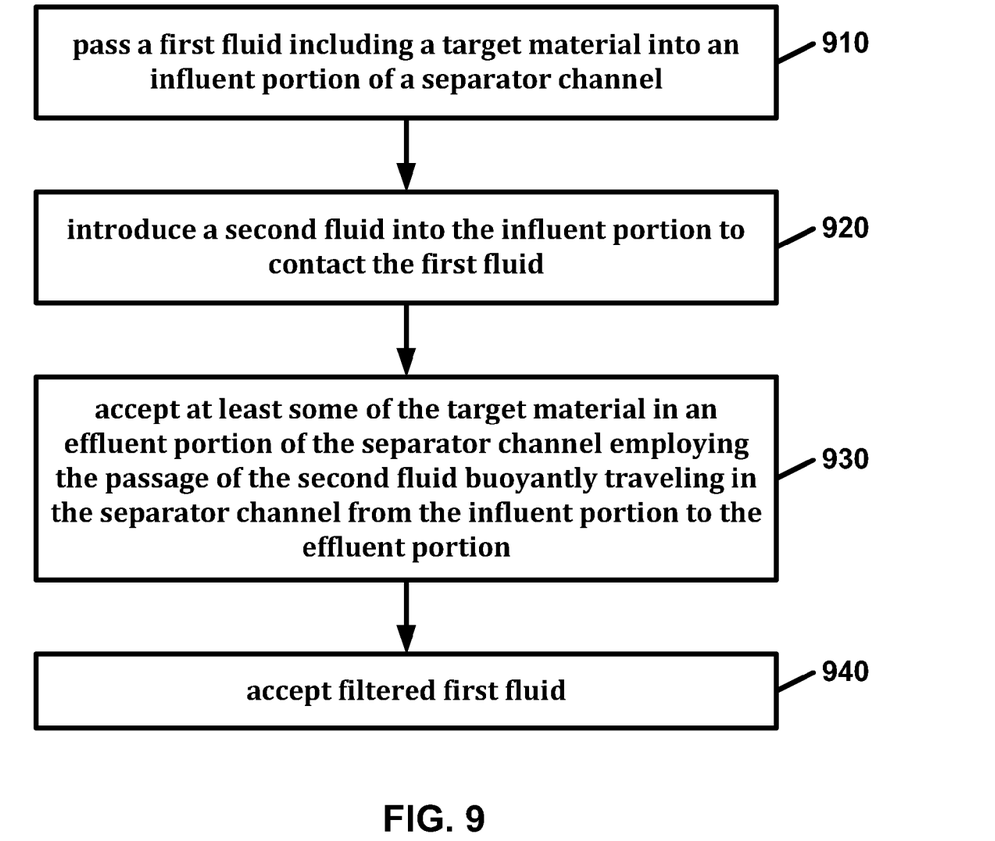
FIG. 9 is a flow diagram of a separation process in accordance with some aspects of embodiments.

According to some aspects of embodiments, a second fluid may be configured to move a first fluid, for example configured to lift a first fluid through a separator channel to a fluid-lift portion of the separator channel. In one aspect of embodiments, a first fluid may have a different density that a second fluid, for example a second fluid may have a density that is less than the density of the first fluid. In another aspect of embodiments, an interaction between a first fluid and a second fluid may separate target material from the first fluid and/or entrain some and/or all of the target material to the second fluid.

According to some aspects of embodiments, a process may include accepting (e.g., accumulate, concentrate, direct, etc.) target material in an effluent portion of a separator channel. In one aspect of embodiments, accepting target material may include employing the passage of a second fluid traveling in a separator channel, for example between an influent portion and an effluent portion (e.g., from an influent portion to an effluent portion). In another aspect of embodiments, a second fluid may buoyantly travel in a separator channel between an influent portion and an effluent portion. As illustrated in some aspects of embodiments in FIG. 9, a process may include accepting target material in an effluent portion of a separator channel employing the passage of a second fluid buoyantly traveling in a separator channel from an influent portion to an effluent portion (930).

According to some aspects of embodiments, a process may include accepting (e.g., accumulate, concentrate, direct, etc.) filtered first fluid. In some aspects of embodiments, filtered first fluid may include first fluid having less target material relative to ambient first fluid. In one aspect of embodiments, a discharger may be disposed under, opposite and/or below a fluid-lift portion, and/or may be employed to accept filtered first fluid. In another aspect of embodiments, a discharger may include a portion external to a separator channel. In further aspects of embodiments, a discharger may include a portion having an angle relative to a portion of an apparatus, for example a downward angle relative to an effluent portion, which may be configured to minimize the passage of a second fluid and/or target material into the discharger. As illustrated in some aspects of embodiments in FIG. 9, a process may include accepting filtered first fluid (940).

According to some aspects of embodiments, a process may include creating a hack-lift pressure. In one aspect of embodiments, a back-lift pressure may be sufficient to approximately maximize a discharge rate of a first fluid discharged through a discharger. In other aspects of embodiments, a process may include discharging a filtered first fluid through a discharger employing back-lift pressure created in a separator.

According to some aspects of embodiments, a process may include introducing a second fluid at a rate configured to minimize damage to the target material. In some aspects of embodiments, a process may include introducing a second fluid configured to minimize damage to the target material. In other aspects of embodiments, a process may include allowing a second fluid to travel between an influent portion and an effluent portion substantially unobstructed to minimize damage to the target material. In further aspects of embodiments, a process may include allowing a target material to accumulate in, and/or pass through, an effluent portion to minimize damage to the target material.

Example 1

According to some aspects of embodiments, a gas-lift-driven separation apparatus may be employed to separate microorganisms and/or suspended particles from a base fluid including, but not limited to, freshwater, seawater, culture media, and/or other fluid combination of a base fluid and suspended particles may refer to working fluid. A gas-lift-driven separation apparatus may include a relatively hollow separation column with a relatively large volume gas diffuser, for example located at the bottom of a separation apparatus partially submersed in a liquid microorganism culture tank. A gas diffuser may take a compressed gas and/or distribute it as bubbles into a working fluid.

According to some aspects of embodiments, a base-fluid-microorganism mixture to be separated may be fed to the bottom of a separation column, which may include a relatively high volumetric flow rate air and/or other compressed gas (between approximately 3 L and 5 L min$^{-1}$) bubbling out of a gas diffuser. Suspended particles, for example organic and/or non-polar particles, including cells and/or other microorganisms may be attracted to the surface of the gas bubbles, the air-water interface, due to hyrdophobicity. As gas bubbles rise to the top of a water column, the separated particles and/or microorganisms are carried with them.

According to some aspects of embodiments, a gradient of microorganism concentration may be established throughout the length of the separation column. The highest concentration may be at the top of the column and the lowest (e.g., nearly completely removed) at the bottom of the water column. A relatively slow overflow of concentrated microorganisms from the top of the water column may be collected in a catchment container, which may be open to the atmosphere. A catchment container may include a concentric cup around the separation column and/or an overflow tube (e.g., tee fitting) which leads to a collection vessel.

According to some aspects of embodiments, a discharger including a substantially parallel discharge column may be attached near an end of a separation column so as to not allow gas bubbling up the separation column into the discharge column. A discharger column may include a "U" tube configuration connected by an upside down "Y" discharger. The outlet of the substantially parallel U-tube may be located at and/or above the ambient input working fluid level (e.g., fluid-fluid surface), but lower than the height of the standing gas-lift water height in a separator column. A differential pressure may be created during the gas-lift-driven separation process, for example by raising the liquid level in the separator column above the ambient working fluid level fed to the separator column. A water height differential may drive a substantially reduced microorganism concentration water (e.g., filtered first fluid) from the separator, through the parallel discharge column to a discharge outlet.

According to some aspects of embodiments, the volume and/or rate of a gas bubbling may determine the change in microorganism concentration from a working fluid and/or to retentate in a catchment container. The volume and/or rate of a gas bubbling may also control the rate of working fluid filtration. The length of a separation column below the U-tube may also control the change of microorganism concentration and/or separator column's single-pass efficiency. The bubble size resulting from a gas diffuser may also affect separation and/or the change of microorganism concentration relative to the working fluid. The height of the discharge tube, for example in relation to the ambient working fluid surface, may also control the rate of separation.

Size fractionation may occur with a separation process in accordance with some aspects of embodiments, for example with relatively smaller organisms and/or particles removed over larger organisms. According to some aspects of embodiment, organisms as large as a few millimeters in length may be collected and concentrated with a separation apparatus and/or processes. In one aspect of embodiments, fluid flow rate through a separator, for example a separator in the approximate shape of a column, and/or through a discharger, for example a discharger in the approximate shape of a column, may be relatively large, for example greater than approximately 7 L $min^{-1}$. In another aspect of embodiments, the concentration increase of target material, for example organisms, between an influent portion and an effluent portion may be relatively large, for example greater than approximately 1000:1.

Example 2

According to some aspects of embodiments, it is expected that an apparatus may be employed to separate radioactive isotopes. In one aspect of embodiments, particle reactive and non-particle reactive radioisotopes may be separated. In another aspect of embodiments, $^{235}U$ series and/or Radium may be adsorbed onto particle suspended in a fluid, for example in freshwater, and/or may desorb and/or fully dissolve in another fluid, for example seawater. In further aspects of embodiments, a $^{210}Pb$ particle may be reactive in fluid, for example seawater, and/or if dissolved in water having other proximate particles, for example clay particles, may adsorb onto such particles which may be separated together with the removal of $^{210}Pb$. In more aspects of embodiments, any desired radioisotopes with similar behavior and/or properties may be employed. In embodiments, Rare Earth elements may exhibit physical adsorption characteristics, for example as a function of a property of a fluid, including salinity of a medium.

In other aspects of embodiments, damage to target material may be minimized, and/or may lead to relatively more efficient processing that employs target material. For example, it is expected that where a reaction is driven by a microorganism, catalyst, and/or the like, the separation of the microorganism from products may be accomplished without substantial harm to the microorganism, and/or the products may be efficiently directed out of a discharger for further processing. In such a case, the microorganism may be allowed to pass back into the ambient working fluid (e.g., first fluid) and/or products may be obtained (e.g., filtered first fluid) such that cost, time and complexity are minimized.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of embodiments used in particular orientations, configurations, etc. However, one skilled in the art will recognize that embodiments of the invention could be employed in any suitable orientation and/or configuration, for example in parallel arrangements, sequential arrangements, parts having a plurality of channels and/or compartments in any desired orientation, and/or the like. In another example, an apparatus may be configured to operate as any desired reactor, for example a batch reactor, continuous stirred tank reactor, semi-batch reactor, plug-flow reactor, bed reactor and/or the like. In another example, any components of an apparatus may employed in an apparatus, for example an upward-angled discharger employed with a downward-angled discharger, and/or may be connected employing any desired connection, for example a catchment receptacle configured to connect to an effluent portion by any desired connection, such as a mechanical and/or chemical connection.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered and/or only optionally used in some embodiments. In one example, accepting target material and/or accepting filtered first fluid may be re-ordered and/or only optionally used in some embodiments. In embodiments, like numerals may reference like elements. For example, numerals 300, 400, 500, 600, and 800 reference an apparatus, numeral 710 references a separator, numerals 214, 314, 414, and 714 reference an influent opening, numeral 722 references a discharger, numerals 730 and 830 reference a discharge outlet, numerals 240, 440, 540, and 740 reference an injector, numerals 250, 350, 450, 550, and 750 reference a catchment receptacle, numerals 270, 370, 470, 570, and 770 reference an effluent outlet, numerals 282, 382, 482, 582, 782 reference an influent portion, numerals 284, 384, 484, 584, and 784 reference a fluid-lift portion, and numerals 286, 386, 486, 586, and 786 reference an effluent portion.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not interpreted under 35 U.S.C. 112, paragraph 6.

What is claimed is:

1. An apparatus comprising:
    a separator including:
        an influent portion to receive a first fluid having target material;
        an effluent portion over the influent portion to receive the target material; and
        a separator channel between the influent portion and the effluent portion to separate the first fluid and the target material, wherein the separator channel is to provide a substantially unobstructed flow of the first fluid being moved by a second fluid to a fluid-lift portion of the separator channel; and
    a discharger between the influent portion and the fluid-lift portion including:
        an opening to the separator channel; and
        a downward-angled portion relative to the effluent portion that is to extend away from the opening and that is to be external to the separator channel to minimize passage of the second fluid into the discharger and maximize passage of a filtered first fluid out of the separator channel.

2. The apparatus according to claim 1, wherein the discharger further includes a discharge channel across a fluid-fluid surface having a discharge outlet over the fluid-fluid surface and below the fluid-lift portion.

3. The apparatus according to claim 1, further including an injector below the discharger to introduce the second fluid into the first fluid.

4. The apparatus according to claim 3, wherein the injector is to include a gas diffuser to introduce the second fluid into the first fluid as a plurality of bubbles.

5. The apparatus according to claim 1, further including at least one additional discharger between the influent portion and the fluid-lift portion including:
    a respective opening to the separator channel; and
    a respective downward-angled portion relative to the effluent portion that is to extend away from the respective opening and that is to be external to the separator channel to minimize passage of the second fluid into the discharger and maximize passage of the filtered first fluid out of the separator channel.

6. The apparatus according to claim 1, further including a catchment receptacle connected to the effluent portion to collect the target material from the first fluid.

7. The apparatus according to claim 6, wherein the catchment receptacle is to include an effluent outlet to direct the target material out of the catchment receptacle.

8. The apparatus according to claim 1, wherein at least one of a discharge channel of the discharger and the separator channel of the separator are in the shape of a column.

9. The apparatus according to claim 1, wherein a discharge channel of the discharger and the separator channel of the separator are at least one of substantially concentric to each other, substantially parallel to each other, or substantially unparallel to each other.

10. The apparatus according to claim 2, wherein the separator channel is to be across the fluid-fluid surface.

11. The apparatus according to claim 1, wherein the fluid-lift portion is to accommodate the first fluid lifted to a height in the separator channel by the second fluid over a fluid-fluid surface.

12. The apparatus according to claim 1, wherein the separator channel is to accommodate a concentration gradient that is to include a larger concentration at the effluent portion relative to the influent portion.

13. The apparatus according to claim 1, further including a membrane between the separator channel and the discharger.

14. The apparatus according to claim 1, wherein the influent portion is to directly receive the first fluid including the target material from outside of the apparatus.

15. A process comprising:
provideing a separator of an apparatus including an influent portion to receive a first fluid having target material, an effluent portion over the influent portion to receive the target material, and a separator channel between the influent portion and the effluent portion to separate the first fluid and the target material, wherein the separator channel is to provide a substantially unobstructed flow of the first fluid being moved by a second fluid to a fluid-lift portion of the separator channel; and
providing a discharger of the apparatus between the influent portion and the fluid-lift portion including an opening to the separator channel and a downward-angled portion relative to the effluent portion that is to extend away from the opening and that is to be external to the separator channel to minimize passage of the second fluid into the discharger and maximize passage of a filtered first fluid out of the separator channel.

16. The process according to claim 15, further including providing the discharger including a discharge channel across a fluid-fluid surface having a discharge outlet over the fluid-fluid surface and below fluid-lift portion.

17. The process according to claim 15, further including providing an injector below the discharger to introduce the second fluid into the first fluid.

18. The process according to claim 15, further including providing at least one additional discharger between the influent portion and the fluid-lift portion including a respective opening to the separator channel and a respective downward-angled portion relative to the effluent portion that is to extend away from the respective opening and that is to be external to the separator channel to minimize passage of the second fluid into the discharger and maximize passage of the filtered first fluid out of the separator channel.

19. The process according to claim 15, further including:
providing a catchment receptacle connected to the effluent portion to collect the target material from the first fluid; and
providing the separator channel across the fluid-fluid surface, wherein the fluid-lift portion is to accommodate the first fluid lifted to a height in the separator channel by the second fluid over the fluid-fluid surface.

20. The apparatus according to claim 1, wherein at least one of the first fluid and the second fluid is at least one of a liquid or a gas.

* * * * *